United States Patent
Luo et al.

(10) Patent No.: US 12,041,387 B1
(45) Date of Patent: Jul. 16, 2024

(54) FRAME RESOLUTION SETTING METHOD BASED ON DEVICE MEDIA FOUNDATION TRANSFORM AND COMPUTER SYSTEM

(71) Applicant: Acer Incorporated, New Taipei (TW)

(72) Inventors: Li-Ju Luo, New Taipei (TW); Chao-Kuang Yang, New Taipei (TW); Liang-Chi Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 38 days.

(21) Appl. No.: 18/172,341

(22) Filed: Feb. 22, 2023

(30) Foreign Application Priority Data

Dec. 29, 2022 (TW) .................................. 111150554

(51) Int. Cl.
*H04N 7/01* (2006.01)
*H04N 23/62* (2023.01)
*H04N 23/80* (2023.01)

(52) U.S. Cl.
CPC ........... *H04N 7/0122* (2013.01); *H04N 23/62* (2023.01); *H04N 23/815* (2023.01)

(58) Field of Classification Search
CPC ...... H04N 7/0122; H04N 7/01; H04N 7/0127; H04N 7/0117; H04N 23/815; H04N 23/62

USPC ................. 348/441, 445, 458, 459
See application file for complete search history.

(56) References Cited

U.S. PATENT DOCUMENTS

2013/0293743 A1* 11/2013 Lee ..................... H04N 23/80
348/231.99

FOREIGN PATENT DOCUMENTS

TW 201644261 12/2016

* cited by examiner

*Primary Examiner* — Sherrie Hsia
(74) *Attorney, Agent, or Firm* — JCIPRNET (57) ABSTRACT

A frame resolution setting method based on device media foundation transform (DMFT) and a computer system are provided. The DMFT establishes a resolution list including at least one first resolution according to the at least one first resolution supported by a main image capture device. An application program provides at least one second resolution to the DMFT to update the resolution list. A camera application program selects a target resolution between the first resolution and the second resolution in the resolution list provided by the DMFT. The application program performs image scaling processing on a plurality of first input image frames generated by the main image capture device according to the target resolution to generate a plurality of first output image frames conforming to the target resolution. The application program provides the first output image frames conforming to the target resolution to the DMFT.

16 Claims, 5 Drawing Sheets

FRAME RESOLUTION SETTING METHOD BASED ON DEVICE MEDIA FOUNDATION TRANSFORM AND COMPUTER SYSTEM

CROSS-REFERENCE TO RELATED APPLICATION

This application claims the priority benefit of Taiwan application serial no. 111150554, filed on Dec. 29, 2022. The entirety of the above-mentioned patent application is hereby incorporated by reference herein and made a part of this specification.

BACKGROUND

Technical Field

The disclosure relates to a computer system, and in particular, relates to a frame resolution setting method based on device media foundation transform (DMFT) and a computer system.

Description of Related Art

With the advancement of technology, image capture devices have become the basic equipment of computer systems. A computer system can provide various functions such as video communication function and photo-taking function through the use of image capture devices. Besides, at present, the mobile electronic devices carried around by users are equipped with the function of image capture as well. Through the communication link between the computer system and the mobile electronic devices, these mobile electronic devices can provide the captured images to the computer system in real time. Under this condition, the computer system can use different image capture devices (e.g., built-in main video recorder, mobile electronic device, or external video recorder, etc.) as image sources and obtain the image content captured by each of these image capture devices to achieve diverse applications. It is known that the image formats and resolutions of images captured by different image capture devices are not the same. However, based on the existing device media foundation transform (DMFT) architecture and specifications, the format and resolution of the image data output by the DMFT is limited by the image format and resolution supported by the main video recorder. That is, in the processing pipeline of the DMFT, the formats and resolutions of the input frame and the output frame are consistent with the image format and resolution supported by the main video recorder. Therefore, even if other video recorders available in the computer system have a better resolution compared to that of the main video recorder, the DMFT still cannot output image data that meets this better resolution, and reduced user experience is thus obviously provided.

SUMMARY

Accordingly, the disclosure provides a frame resolution setting method based on device media foundation transform (DMFT) and a computer system capable of solving the above technical problems.

The disclosure provides a frame resolution setting method based on device media foundation transform, and the method includes the following steps. The device media foundation transform establishes a resolution list including at least one first resolution according to the at least one first resolution supported by a main image capture device. An application program provides at least one second resolution to the device media foundation transform to update the resolution list. A camera application program selects a target resolution between the at least one first resolution and the at least one second resolution in the resolution list provided by the device media foundation transform. The application program performs image scaling processing on a plurality of first input image frames generated by the main image capture device according to the target resolution to correspondingly generate a plurality of first output image frames conforming to the target resolution. The application program provides the first output image frames conforming to the target resolution to the device media foundation transform.

The disclosure further provides a computer system including a main image capture device, a storage device, and a processor. The storage device records device media foundation transform, an application program, and a camera application program. The processor is coupled to the main image capture device and the storage device and is configured to execute the device media foundation transform, the application program, and the camera application program. The device media foundation transform establishes a resolution list including at least one first resolution according to the at least one first resolution supported by a main image capture device. The application program provides at least one second resolution to the device media foundation transform to update the resolution list. The camera application program selects a target resolution between the at least one first resolution and the at least one second resolution in the resolution list provided by the device media foundation transform. The application program performs image scaling processing on a plurality of first input image frames generated by the main image capture device according to the target resolution to correspondingly generate a plurality of first output image frames conforming to the target resolution. The application program provides the first output image frames conforming to the target resolution to the device media foundation transform.

Based on the above, in the embodiments of the disclosure, an application program capable of providing the second resolution not supported by the main image capture device to the DMFT is present. In this way, the selectable resolutions of the camera application program are expanded, so that the output image frames of the DMFT are not limited to the first resolution supported by the main image capture device.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Several embodiments of the disclosure are described in detail below accompanying with figures. In terms of the reference numerals used in the following descriptions, the same reference numerals in different figures should be considered as the same or the like elements. The embodiments are only a portion of the disclosure, which do not present all embodiments of the disclosure. More specifically, these embodiments serve as examples of the method and the system fall within the scope of the claims of the disclosure.

Figure 1:
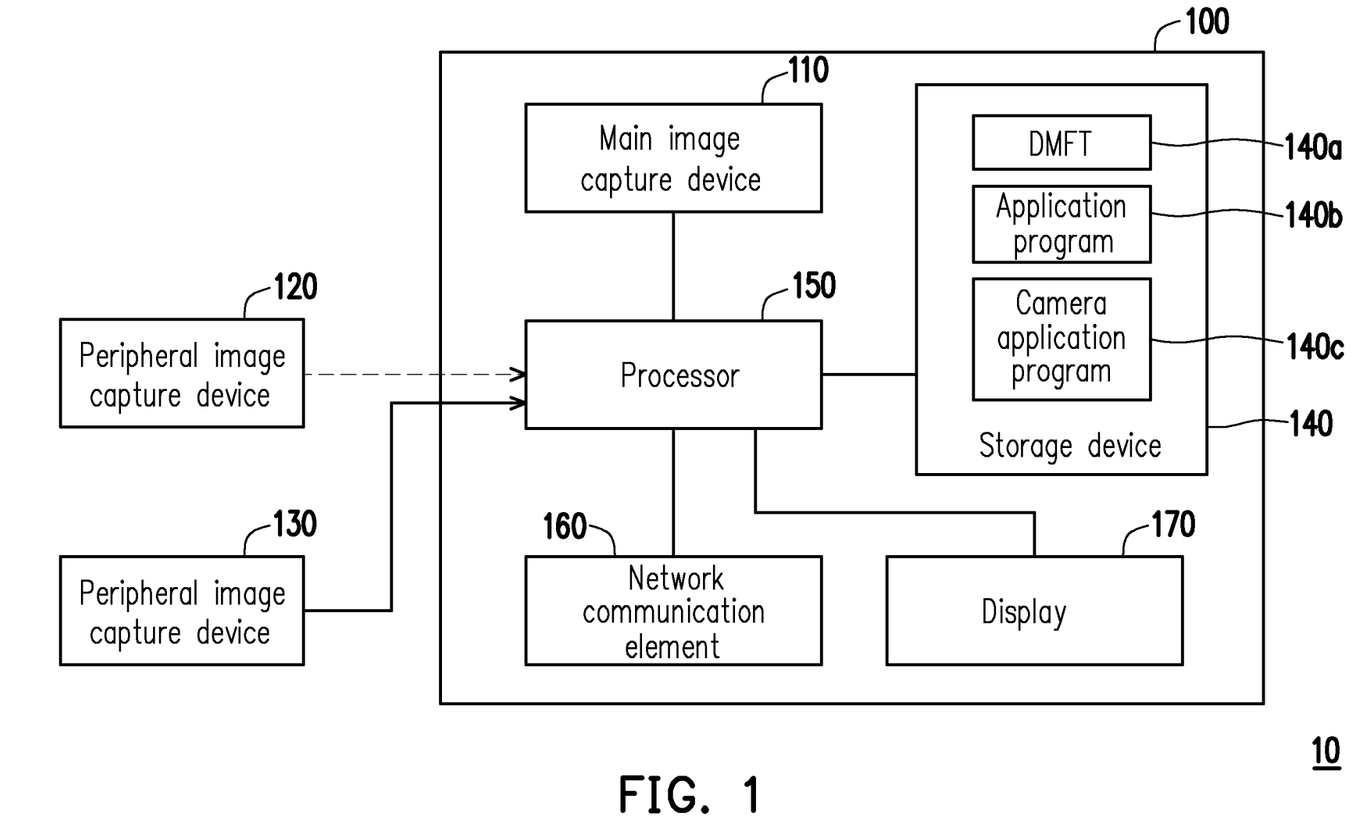
FIG. 1 is a block diagram of a computer system according to an embodiment of the disclosure.

FIG. 1 is a block diagram of a computer system according to an embodiment of the disclosure With reference to FIG. 1, a computer system 10 includes a main image capture device 110, a peripheral image capture device 120, a peripheral image capture device 130, a storage device 140, a processor 150, a network communication element 160, and a display 170. The processor 150 may be coupled to the main image capture device 110, the peripheral image capture device 120, the peripheral image capture device 130, the storage device 140, the network communication element 160, and the display 170.

In some embodiments, the computer system 10 may be implemented as a computer device 100 having the main image capture device 110, the storage device 140, the network communication element 160, the display 170, and the peripheral image capture device 120 and the peripheral image capture device 130 connected to the computer device 100 in a wired or wireless manner. For instance, the peripheral image capture device 120 may be connected to the processor 150 via a wireless communication interface. The aforementioned wireless transmission interface is, for example, a Bluetooth interface, a WiFi interface, or other wireless transmission interfaces. The peripheral image capture device 130 may be connected to the processor 150 via a wired transmission interface. The aforementioned wired transmission interface is, for example, a USB interface or other wired transmission interfaces.

In some embodiments, the main image capture device 110 may be a built-in video recorder built in the computer device 100. In some embodiments, the peripheral image capture device 120 may be a mobile electronic device with image capture function, such as a mobile phone, a tablet computer, or a digital camera, etc., and the disclosure is not limited thereto. In some embodiments, the peripheral image capture device 130 may be an external video recorder or a network video recorder and the like, and the disclosure is not limited thereto. For instance, the computer system 10 may be formed by a notebook computer or a desktop computer and an external video recorder. Alternatively, the computer system 10 may be formed by a notebook computer or a desktop computer and a smart phone.

Each of the main image capture device 110, the peripheral image capture device 120, and the peripheral image capture device 130 may be used to capture images to generate image streams and may include a camera lens having a lens and a photosensitive element. The photosensitive element is used to sense the intensity of the light entering the lens to generate an image. The photosensitive element may be, for example, a charge coupled device (CCD), a complementary metal-oxide semiconductor (CMOS), or any other elements, but the disclosure is not limited thereto.

The storage device 140 is configured to store data such as a file, an image, a command, a program code, a software element, etc., and may be, for example, a fixed or movable random access memory (RAM) in any form, a read-only memory (ROM), a flash memory, a hard disc or other similar devices, an integrated circuit, and a combination thereof.

The network communication element 160 is configured to be connected to a network, so that the computer system 10 may communicate with other devices via the network. The network communication element 160 may support a wired communication standard or a wireless communication standard, which is not limited in the disclosure. In some embodiments, when the network communication element 160 supports a wireless communication standard, the network communication element 160 may include an antenna, a transceiver, and the like. In some embodiments, when the network communication element 160 supports a wired communication standard, the network communication component 160 may include a cable connection port, a transceiver, and the like.

The display 170 may be a liquid crystal display (LCD), a light emitting diode (LED) display, an organic light emitting diode (OLED) display, or other various types of displays, but the disclosure is not limited thereto. The display 170 may be configured to display a graphical user interface (GUI) or an application screen of various application programs.

The processor 150 is configured to control the overall actions of the computer system 10. The processor 150 may be, for example, a central processing unit (CPU), a programmable microprocessor for general or special use, a digital signal processor (DSP), a programmable controller, an application specific integrated circuit (ASIC), a programmable logic device (PLD), other similar devices, or a combination of the foregoing devices.

The processor 150 may execute the program codes, software modules, instructions, etc. recorded in the storage device 140 to implement a frame resolution setting method based on device media foundation transform (DMFT) provided by the embodiments of the disclosure. To be specific, in the embodiments of the disclosure, the storage device 140 may record DMFT 140a, an application program 140b, and a camera application program 140c, and the processor 150 may execute the DMFT 140a, the application program 140b, and the camera application program 140c.

In some embodiments, the camera application program 140c is an application program, such as a video conference application program, a live streaming application program, or a communication application program, that needs to activate the main image capture device 110, the peripheral image capture device 120, or the peripheral image capture device 130 to capture image data to achieve a specific function.

In some embodiments, the operation of the main image capture device 110 is related to a hardware driver of the main image capture device 110 and the DMFT 140a. The hardware driver of the main image capture device 110 is executed in the kernel mode of the operating system. The DMFT 140a is executed in the user mode of the operating system. The DMFT 140a is a user mode extension function. Further, the DMFT 140a is a special media foundation transform (MFT), and the DMFT 140a may provide some frame processing functions, such as video editing, image previewing, image stabilization, etc., for different types of camera application programs 140c. To be more specific, the DMFT 140a may be encapsulated in a camera driver stack and may be configured to perform post-processing on the image frames obtained from the main image capture device 110.

In some embodiments, the application program 140*b* may be a plug-in application program associated with the DMFT 140*a*, which can be used to perform other post-processing, such as image tone processing or image synthesis processing, etc., on the transmitted image frame in a processing pipeline of the DMFT 140*a*. For instance, the application program 140*b* may provide image synthesis processing, which can synthesize the image frame generated by the main image capture device 110 and the image frame generated by the peripheral image capture device 120.

Figure 2:
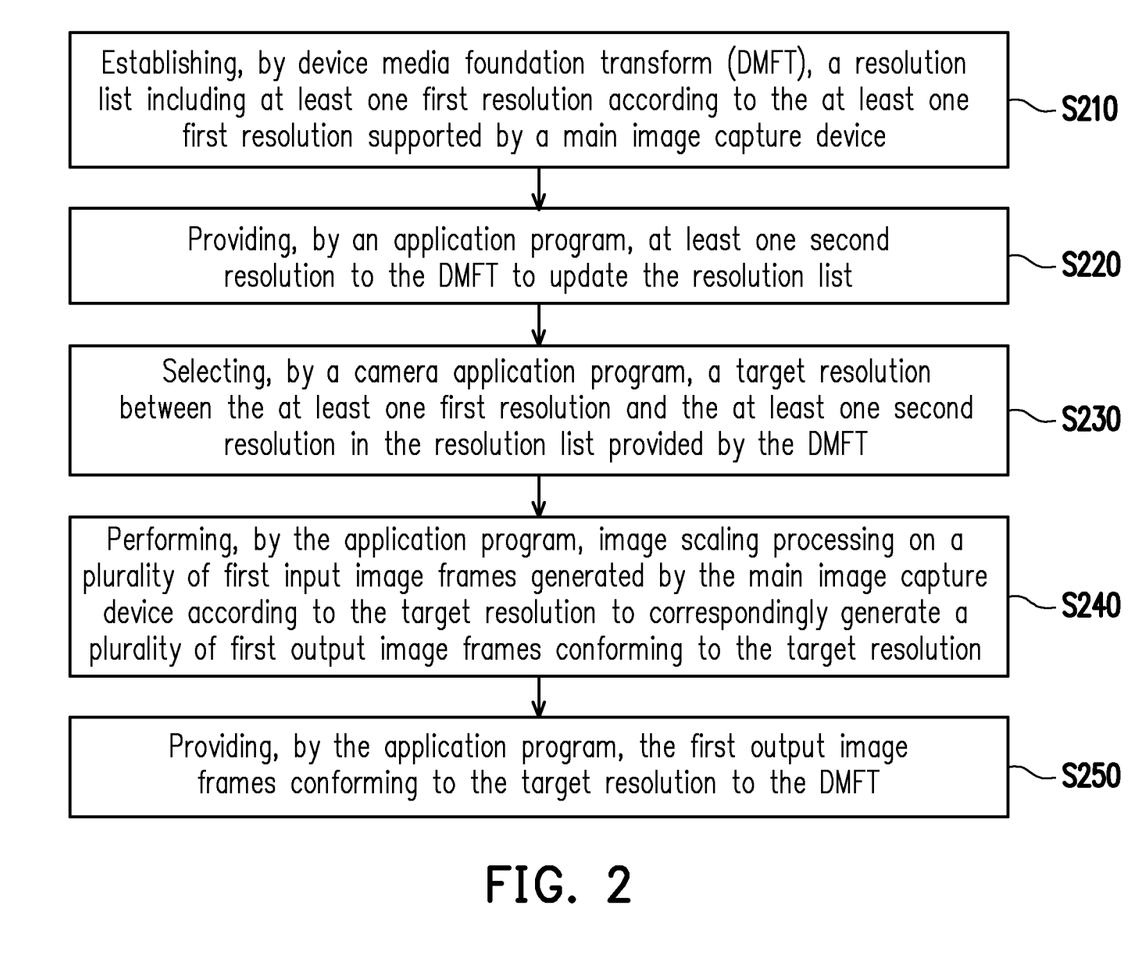
FIG. 2 is a flow chart of a frame resolution setting method based on device media foundation transform (DMFT) according to an embodiment of the disclosure.

FIG. 2 is a flow chart of a frame resolution setting method based on DMFT according to an embodiment of the disclosure. With reference to FIG. 2, the method provided by this embodiment is applicable to the abovementioned computer system 10, and description of the detailed steps of this embodiment together with various elements in the computer system 10 are to be provided in the following paragraphs.

In step 210, according to at least one first resolution supported by the main image capture device 110, the DMFT 140*a* establishes a resolution list including the least one first resolution. That is, the image frame generated by the main image capture device 110 has the at least one first resolution. However, in the disclosure, the number of the at least one first resolution is not limited, and this number may vary depending on actual application conditions.

In step 220, the application program 140*b* provides at least one second resolution to the DMFT 140*a* to update the resolution list, so that the resolution list may include the at least one first resolution and the at least one second resolution. In the disclosure, the number of the at least one second resolution is not limited, and this number may vary depending on actual application conditions. To be specific, the DMFT 140*a* may update the resolution list with these second resolutions according to an event sent by the application program 140*b* by listening to the event from the application program 140*b*. In other words, the application program 140*b* may send an event to notify the DMFT 140 to add the second resolutions to the resolution list.

In some embodiments, the application program 140*b* obtains the at least one second resolution through a user interface. Further, the application program 140*b* may provide a user interface, and the display 170 can display the user interface. The user interface provided by the application program 140*b* may include a plurality of default resolutions for the user to select. The default resolutions may be the same as or different from the first resolution. The second resolution may be selected from these default resolutions in response to a selection operation given by the user, so that the application program 140*b* may obtain the at least one second resolution according to the user operation and the user interface.

In some embodiments, the application program 140*b* obtains the at least one second resolution supported by the peripheral image capture device 120. Further, the application program 140*b* may detect the presence of the peripheral image capture device 120 and may further obtain the second resolution supported by the peripheral image capture device 120. That is, after the peripheral image capture device 120 establishes a connection with the computer device 100, the application program 140*b* may obtain the second resolution supported by the peripheral image capture device 120. Similarly, in some embodiments, the application program 140*b* may obtain a third resolution supported by the peripheral image capture device 130.

In step 230, the camera application program 140*c* selects a target resolution between the at least one first resolution and the at least one second resolution in the resolution list provided by the DMFT 140*a*. To be specific, the camera application 140*c* may obtain the resolution list through an application program interface (API) provided by the DMFT 140*a*. The camera application program 140*c* may select the target resolution from the resolution list provided by the DMFT 140*a* according to user operations or custom rules. That is, the target resolution is one of the first resolution and the second resolution in the updated resolution list.

It should be noted that in some embodiments, step S210 to step S230 may be completed in an initialization phase of the DMFT 140*a*.

In step 240, the application program 140*b* performs image scaling processing on a plurality of first input image frames generated by the main image capture device 110 according to the target resolution to correspondingly generate a plurality of first output image frames conforming to the target resolution. In detail, since the camera application program 140*c* may select the second resolution not supported by the main image capture device 110 as the target resolution, application program 140*b* performs image scaling processing on the plurality of first input image frames generated by the main image capture device 110, so that the camera application program 140*c* may subsequently obtain the plurality of first output image frames conforming to the target resolution. It should be noted that in some embodiments, the first input image frames may have undergone some post-processing in the processing pipeline of the DMFT 140*a*.

In step 250, the application program 140*b* provides the first output image frames conforming to the target resolution to the DMFT 140*a*. Further, the application program 140*b* may write the scaled first output image frames into a buffer of the application program 140*b*. Afterwards, when the user selects the main image capture device 110 as an image source, the first output image frames conforming to the target resolution in the buffer of the application program 140*b* are provided to the DMFT 140*a*. In this way, the DMFT 140*a* may provide the first output image frames conforming to the target resolution to the camera application program 140*c*, so that the first output image frames may be displayed on the display 170 or may be sent to other electronic apparatuses through the network communication element 160. It can be seen that after the resolution list is expanded, the resolution of the first output image frames provided by the DMFT 140*a* is not limited to the first resolution supported by the main image capture device 110.

Similarly, in some embodiments, the application program 140*b* performs image scaling processing on a plurality of second input image frames generated by the peripheral image capture device 120 according to the target resolution to correspondingly generate a plurality of second output image frames conforming to the target resolution. Next, the application program 140*b* provides the second output image frames conforming to the target resolution to the DMFT. The application program 140*b* may write the scaled second output image frames into the buffer of the application program 140*b*. Afterwards, when the user selects the peripheral image capture device 120 as an image source, the second output image frames conforming to the target resolution in the buffer of the application program 140*b* are provided to the DMFT 140*a*. In this way, the DMFT 140*a* may provide the second output image frames conforming to the target resolution to the camera application program 140*c*. It can be seen that after the resolution list is expanded, the resolution of the second output image frames provided by the DMFT 140*a* is not limited to the first resolution supported by the main image capture device 110.

That is, in some embodiments, after the first output image frames and the second output image frames conforming to the target resolution are generated, the DMFT 140*a* may provide the first output image frames conforming to the target resolution or the second output image frames conforming to the target resolution to the camera application program 140*c*.

In addition, in some embodiments, the application program 140*b* obtains the at least one second resolution supported by the peripheral image capture device 120 and provides the at least one second resolution to the DMFT 140*a* to update the resolution list. Further, the application program 140*b* obtains the at least one third resolution supported by the another peripheral image capture device 130 and provides the at least one third resolution to the DMFT 140*a* to update the resolution list. In this case, the resolution list may include the at least one first resolution, the at least one second resolution, and the at least one third resolution. Therefore, the camera application program 140*c* may select the target resolution among the at least one first resolution, the at least one second resolution, and the at least one third resolution in the resolution list provided by the DMFT 140*a*.

Figure 3:
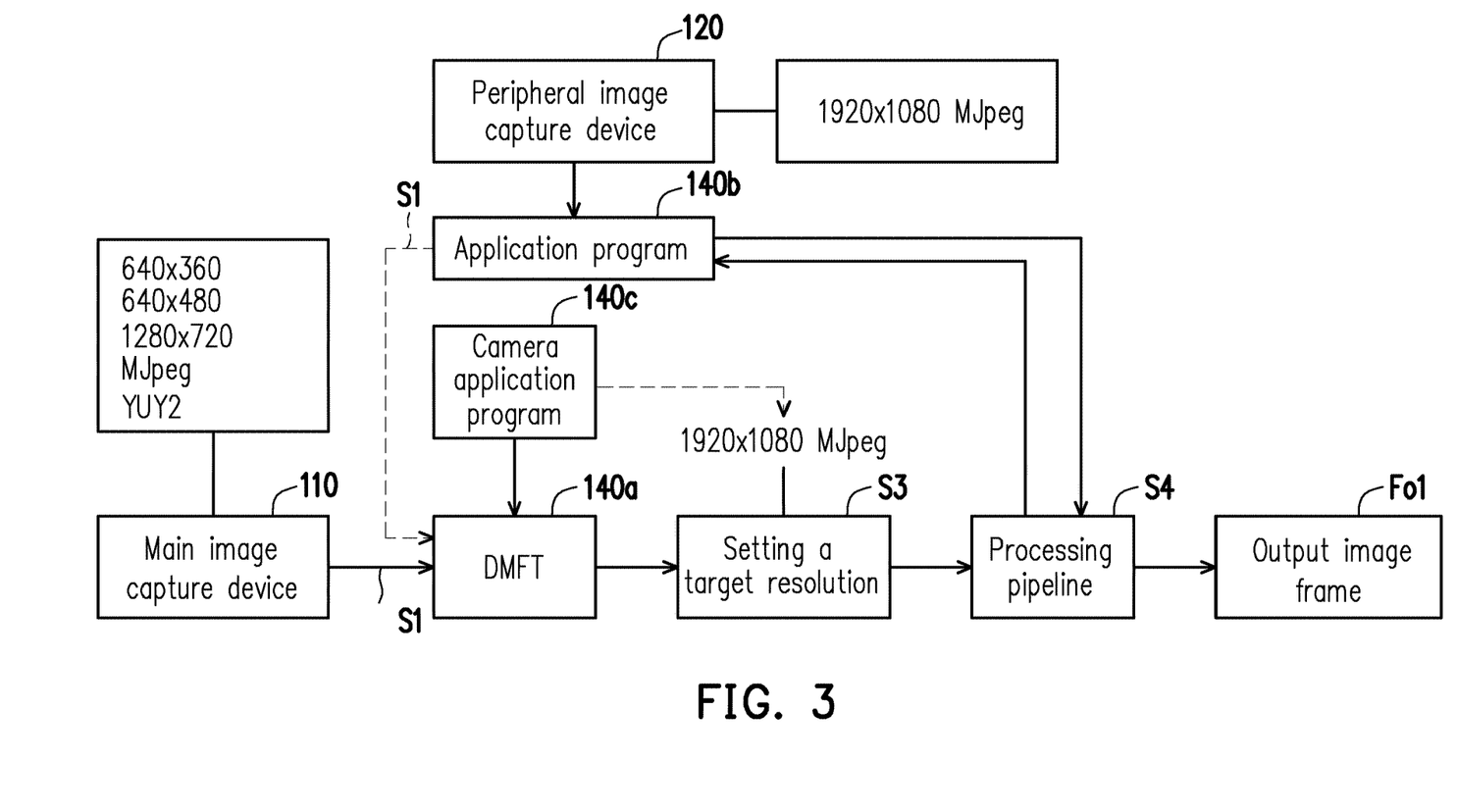
FIG. 3 is a schematic diagram of an architecture of the frame resolution setting method based on the DMFT according to an embodiment of the disclosure.

FIG. 3 is a schematic diagram of an architecture of the frame resolution setting method based on the DMFT according to an embodiment of the disclosure. With reference to FIG. 3, when the camera application program 140*c* activates the camera function, the DMFT 140*a* is also activated. In the initialization phase of the DMFT 140*a*, in operation S1, the DMFT 140*a* may obtain the first resolution and the image format supported by the main image capture device 110 as shown in Table 1 below to create a resolution list including the first resolution.

TABLE 1

| Index | First Resolution | Image Format |
|---|---|---|
| 0 | 1280 × 720 | MJpeg |
| 1 | 640 × 480 | MJpeg |
| 2 | 640 × 360 | MJpeg |
| 3 | 1280 × 720 | NV12 |
| 4 | 640 × 480 | NV12 |
| 5 | 640 × 360 | NV12 |

On the other hand, the application program 140*b* may obtain the second resolution "1920×1080" and the image format "MJpeg" supported by the peripheral image capture device 120. As such, in operation S2, the application program 140*b* may send the second resolution "1920×1080" and the image format "MJpeg" supported by the peripheral image capture device 120 to the DMFT 140*a* to update the resolution list.

After that, in operation S3, the camera application program 140*c* may select the target resolution "1920×1080" and a target image format "MJpeg" from the first resolution and the image format and the second resolution "1920×1080" and the image format "MJpeg" shown in Table 1. In operation S4, the application program 140*b* captures the first output image frames conforming to an initial resolution from the processing pipeline of the DMFT 140*a*. The initial resolution may be any one of the first resolutions shown in Table 1. In response to the initial resolution being different from the target resolution, the application program 140*b* scales the captured first input image frames according to the target resolution to generate a first output image frame Fo1. For instance, assuming that the initial resolution of the first input image frames generated by the main image capture device 110 is "640×480" and the target resolution set by the camera application program 140*c* is "1280×720", the application program 140*b* may perform up-scaling processing on the first input image frames to generate the first output image frames.

In other cases, in response to the initial resolution being the same as the target resolution, the application program 140*b* may omit scaling the first input image frames according to the target resolution to generate the first output image frames. For instance, assuming that the initial resolution of the first input image frames generated by the main image capture device 110 is "1280×720" and the target resolution set by the camera application program 140*c* is "1280×720", the application program 140*b* may omit scaling the first input image frames to generate the first output image frames, that is, the image scaling operation is not performed on the first input image frames.

Figure 4:
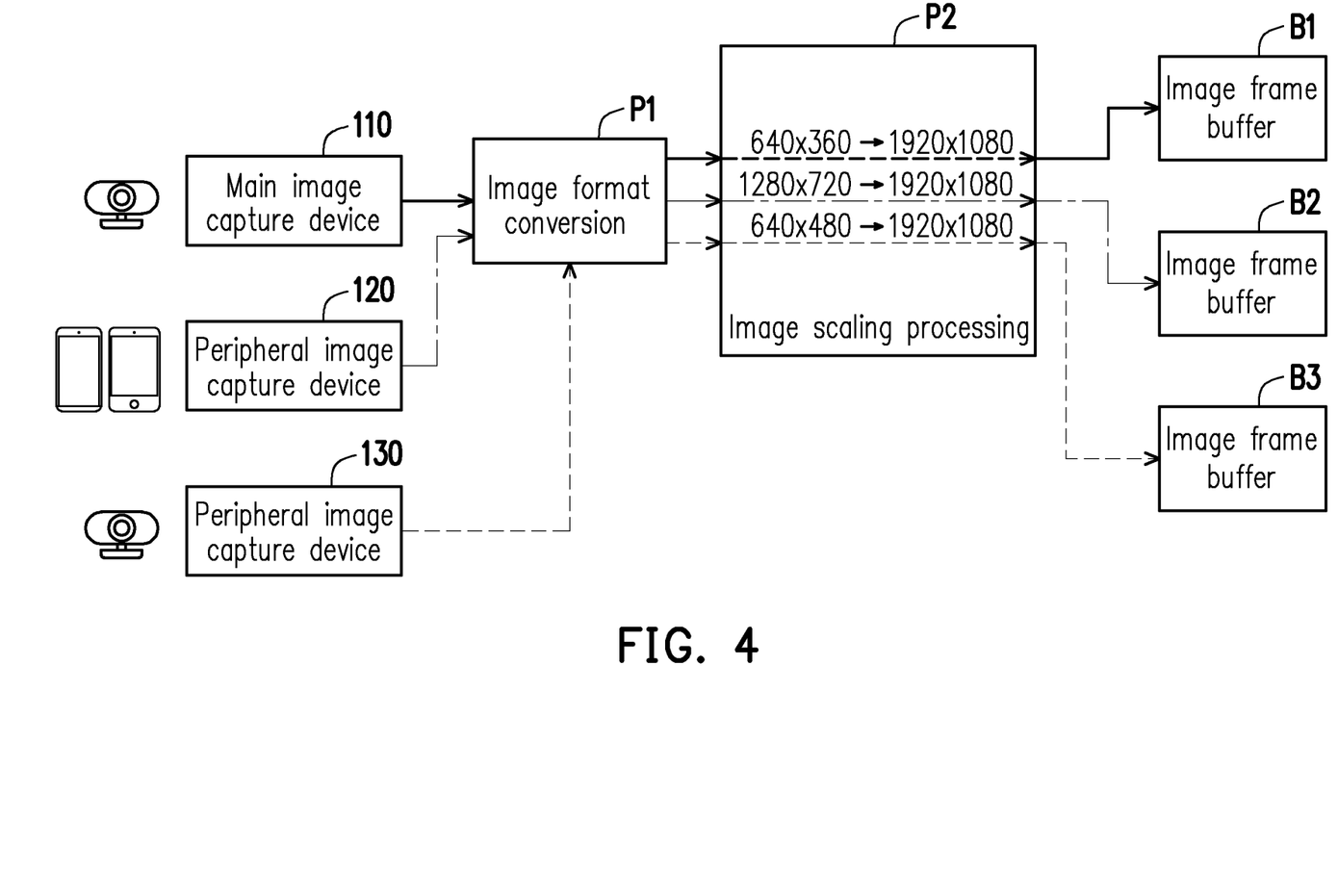
FIG. 4 is a schematic diagram of generation of output image frames according to an embodiment of the disclosure.

FIG. 4 is a schematic diagram of generation of output image frames according to an embodiment of the disclosure. With reference to FIG. 4, the application program 140*b* may perform image scaling on input image frames generated by a plurality of image sources. After the initialization phase of the DMFT 140*a* and after the target resolution is set by the camera application program 140*c*, the DMFT 140*a* may start transmitting the image data of the main image capture device 110. The application program 140*b* may capture the first input image frame from the processing pipeline of the DMFT 140*a*.

Next, as shown in FIG. 4, the application program 140*b* performs image format conversion P1 on the first input image frame, that is, converts the compressed image format into an original data format that can be post-processed. For instance, the application program 140*b* may convert the image format "MJpeg" into the image format "NV12" for subsequent image processing. Next, the application program 140*b* performs image scaling processing P2 on the first input image frame. To be specific, the application program 140*b* compares whether the initial resolution of the first input image frame is the same as the target resolution. In this example, the initial resolution of the first input image frame is "640×360". Therefore, the application program 140*b* up-scales the first input image frame conforming to the initial resolution "640×360" to the first output image frame conforming to the target resolution "1920×1080". Afterwards, the first output image frame with the target resolution "1920×1080" and the image format "NV12" may be put into an image frame buffer B1 associated with the main image capture device 110.

On the other hand, as shown in FIG. 4, it is assumed that the second input image frame generated by the peripheral image capture device 120 has an initial resolution of "1280×720" and an image format of "MJpeg". Similarly, the application program 140*b* performs the image format conversion P1 and the image scaling processing P2 on the second input image frame. The application program 140*b* may convert the image format "MJpeg" into the image format "NV12" for subsequent image processing. In this example, the initial resolution of the second input image frame is "1280×720". Therefore, the application program 140*b* up-scales the second input image frame conforming to the initial resolution "1280×720" to the second output image frame conforming to the target resolution "1920×1080". Afterwards, the second output image frame with the target resolution "1920×1080" and the image format "NV12" may be put into an image frame buffer B2 associated with the peripheral image capture device 120.

In addition, as shown in FIG. 4, it is assumed that the third input image frame generated by the peripheral image capture device 130 has an initial resolution of "640×480" and an image format of "MJpeg". Similarly, the application program 140b performs the image format conversion P1 and the image scaling processing P2 on the third input image frame. The application program 140b may convert the image format "MJpeg" into the image format "NV12" for subsequent image processing. In this example, the initial resolution of the third input image frame is "640×480". Therefore, the application program 140b up-scales the third input image frame conforming to the initial resolution "640×480" to the third output image frame conforming to the target resolution "1920×1080". Afterwards, the third output image frame with the target resolution "1920×1080" and the image format "NV12" may be put into an image frame buffer B3 associated with the peripheral image capture device 130.

When the user selects the main image capture device 110, the peripheral image capture device 120, or the peripheral image capture device 130 as the image source, the application program 140b may fetch the output image frame from the image frame buffer corresponding to the selected image source and sends the output image frame back to the DMFT 140a, so as to provide the output image frame conforming to the target resolution to the camera application program 140c.

It should be noted that when an aspect ratio of the initial resolution is different from an aspect ratio of the target resolution, the application program 140b may perform black border padding on the proportionally up-scaled image to generate an output image frame without distortion. In some embodiments, in response to the aspect ratio corresponding to the initial resolution being different from the aspect ratio corresponding to the target resolution, the application program 140b performs black border padding to generate the first output image frames after performing scaling on the first input image frames in a same proportion in a horizontal direction and in a vertical direction.

Figure 5A:
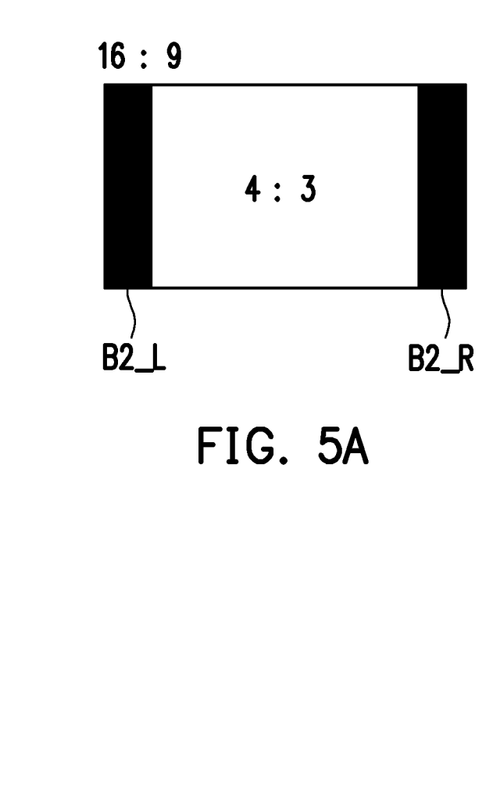
FIG. 5A and FIG. 5B are schematic diagrams of black border padding and generation of output image frames according to an embodiment of the disclosure.
Figure 5B:
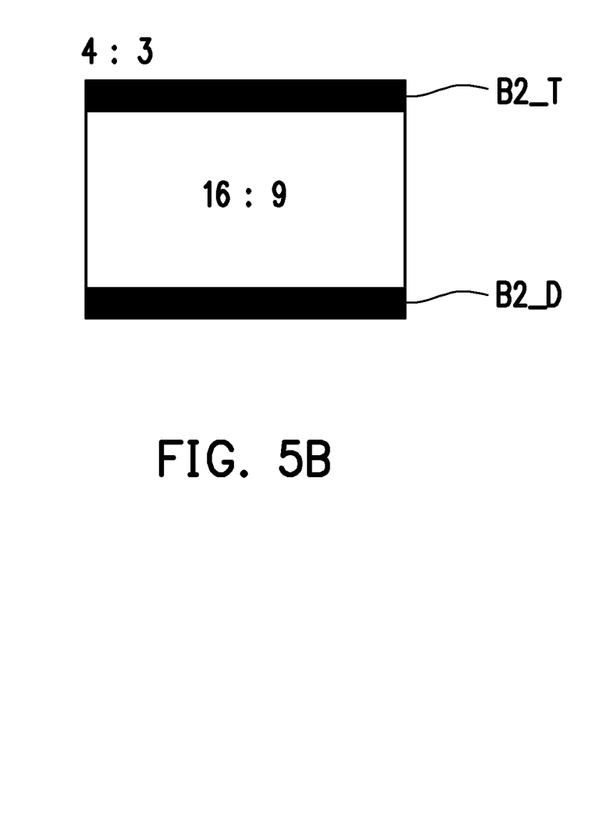

For instance, FIG. 5A and FIG. 5B are schematic diagrams of black border padding and generation of output image frames according to an embodiment of the disclosure. With reference to FIG. 5A, when the aspect ratio of the initial resolution is 4:3 and the aspect ratio of the target resolution is 16:9, the application program 140b scales the first input image frame in the same proportion in the horizontal direction and in the vertical direction and pads black borders B2_L and B2_R on the left and right sides of the up-scaled image to generate the first output image frame. With reference to FIG. 5B, when the aspect ratio of the initial resolution is 16:9 and the aspect ratio of the target resolution is 4:3, the application program 140b scales the first input image frame in the same proportion in the horizontal direction and in the vertical direction and pads black borders B2_T and B2_D on the upper and lower sides of the up-scaled image to generate the first output image frame.

In view of the foregoing, in the embodiments of the disclosure, an application program capable of providing the second resolution not supported by the main image capture device to the DMFT is provided. In this way, the selectable resolutions of the camera application program are expanded, so that the output image frames of the DMFT are not limited to the first resolution supported by the main image capture device. In the embodiments of the disclosure, the problem that the resolution of the image frame used by the camera application program is limited by the main image capture device can be solved, so that the application range can be flexible and improved user experience is provided.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A frame resolution setting method based on device media foundation transform (DMFT), comprising:
    establishing, by the device media foundation transform, a resolution list comprising at least one first resolution according to the at least one first resolution supported by a main image capture device;
    providing, by an application program, at least one second resolution to the device media foundation transform to update the resolution list;
    selecting, by a camera application program, a target resolution between the at least one first resolution and the at least one second resolution in the resolution list provided by the device media foundation transform;
    performing, by the application program, image scaling processing on a plurality of first input image frames generated by the main image capture device according to the target resolution to correspondingly generate a plurality of first output image frames conforming to the target resolution; and
    providing, by the application program, the first output image frames conforming to the target resolution to the device media foundation transform.

2. The frame resolution setting method based on the device media foundation transform according to claim 1, further comprising:
    obtaining, by the application program, the at least one second resolution, through a user interface.

3. The frame resolution setting method based on the device media foundation transform according to claim 1, further comprising:
    obtaining, by the application program, the at least one second resolution supported by a peripheral image capture device.

4. The frame resolution setting method based on the device media foundation transform according to claim 3, further comprising:
    obtaining and providing, by the application program, at least one third resolution supported by another peripheral image capture device to the device media foundation transform to update the resolution list,
    wherein the step of selecting, by the camera application program, the target resolution between the at least one first resolution and the at least one second resolution in the resolution list provided by the device media foundation transform comprises:
    selecting, by the camera application program, the target resolution among the at least one first resolution, the at least one second resolution, and the at least one third resolution in the resolution list provided by the device media foundation transform.

5. The frame resolution setting method based on the device media foundation transform according to claim 3, further comprising:
    performing, by the application program, image scaling processing on a plurality of second input image frames generated by the peripheral image capture device according to the target resolution to correspondingly generate a plurality of second output image frames conforming to the target resolution; and providing, by the application program, the second output image frames conforming to the target resolution to the device media foundation transform.

6. The frame resolution setting method based on the device media foundation transform according to claim 5, further comprising:

providing, by the device media foundation transform, the first output image frames conforming to the target resolution or the second output image frames conforming to the target resolution to the camera application program.

7. The frame resolution setting method based on the device media foundation transform according to claim 1, wherein the step of performing, by the application program, image scaling processing on the plurality of first input image frames generated by the main image capture device according to the target resolution to correspondingly generate the plurality of first output image frames conforming to the target resolution comprises:

capturing, by the application program, the first input image frames conforming to an initial resolution from a processing pipeline of the device media foundation transform;

scaling, by the application program, the first input image frames according to the target resolution to generate the first output image frames in response to the initial resolution being different from the target resolution; and omitting scaling, by the application program, the first input image frames according to the target resolution to generate the first output image frames in response to the initial resolution being the same as the target resolution.

8. The frame resolution setting method based on the device media foundation transform according to claim 7, wherein the step of scaling, by the application program, the first input image frames according to the target resolution to generate the first output image frames in response to the initial resolution being different from the target resolution comprises:

performing, by the application program, black border padding to generate the first output image frames after performing scaling on the first input image frames in a same proportion in a horizontal direction and in a vertical direction in response to an aspect ratio corresponding to the initial resolution being different from an aspect ratio corresponding to the target resolution.

9. A computing system, comprising:

a main image capture device;

a storage device, recording device media foundation transform, an application program, and a camera application program; and a processor, coupled to the main image capture device and the storage device and executing the device media foundation transform, the application program, and the camera application program, wherein the device media foundation transform establishes a resolution list comprising at least one first resolution according to the at least one first resolution supported by the main image capture device, and the application program provides at least one second resolution to the device media foundation transform to update the resolution list, the camera application program selects a target resolution between the at least one first resolution and the at least one second resolution in the resolution list provided by the device media foundation transform, the application program performs image scaling processing on a plurality of first input image frames generated by the main image capture device according to the target resolution to correspondingly generate a plurality of first output image frames conforming to the target resolution, and the application program provides the first output image frames conforming to the target resolution to the device media foundation transform.

10. The computer system according to claim 9, wherein the application program obtains the at least one second resolution through a user interface.

11. The computer system according to claim 9, further comprising a peripheral image capture device coupled to the processor, wherein the application program obtains the at least one second resolution supported by the peripheral image capture device.

12. The computer system according to claim 11, further comprising another peripheral image capture device coupled to the processor, wherein the application program obtains and provides at least one third resolution supported by the another peripheral image capture device to the device media foundation transform to update the resolution list, wherein the camera application program selects the target resolution among the at least one first resolution, the at least one second resolution, and the at least one third resolution in the resolution list provided by the device media foundation transform.

13. The computer system according to claim 11, wherein the application program performs image scaling processing on a plurality of second input image frames generated by the peripheral image capture device according to the target resolution to correspondingly generate a plurality of second output image frames conforming to the target resolution, and the application program provides the second output image frames conforming to the target resolution to the device media foundation transform.

14. The computer system according to claim 13, wherein the device media foundation transform provides the first output image frames conforming to the target resolution or the second output image frames conforming to the target resolution to the camera application program.

15. The computer system according to claim 9, wherein the application program captures the first input image frames conforming to an initial resolution from a processing pipeline of the device media foundation transform, wherein the application program scales the first input image frames according to the target resolution to generate the first output image frames in response to the initial resolution being different from the target resolution, and the application program omits scaling the first input image frames according to the target resolution to generate the first output image frames in response to the initial resolution being the same as the target resolution.

16. The computer system according to claim 15, wherein the application program performs black border padding to generate the first output image frames after performing scaling on the first input image frames in a same proportion in a horizontal direction and in a vertical direction in response to an aspect ratio corresponding to the initial resolution being different from an aspect ratio corresponding to the target resolution.

* * * * *